April 30, 1957 L. H. MORIN 2,790,223
CENTER LEDGE SCOOP FOR SEPARABLE FASTENERS
Filed Jan. 19, 1953
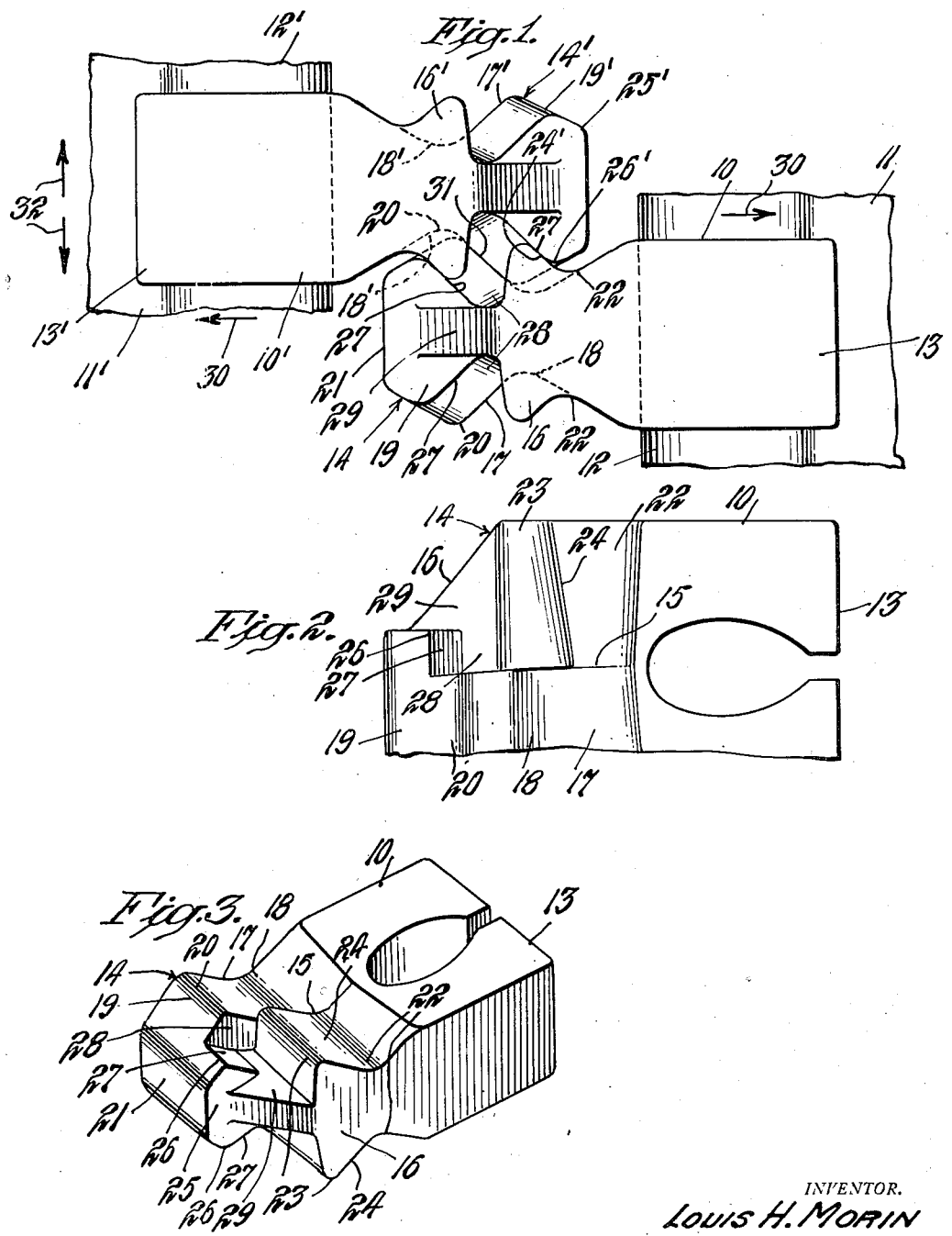
INVENTOR.
Louis H. Morin
BY
ATTORNEY United States Patent Office 2,790,223
Patented Apr. 30, 1957

2,790,223

CENTER LEDGE SCOOP FOR SEPARABLE FASTENERS

Louis H. Morin, Bronx, N. Y.

Application January 19, 1953, Serial No. 331,904

12 Claims. (Cl. 24—205.13)

This invention relates to scoops for separable fastener stringers, particularly scoops of what I term the center ledge type. More particularly, the invention deals with scoops of the character described having angular surfaces on the coupling end portion which cooperate one with the other on coupled scoops so as to increase the bearing surfaces and thus distribute the load so as to avoid breakage when the scoops are subjected to the different strains or stresses and, particularly, in the strengthening of scoops made of nylon or other plastic material.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a side view of one scoop of each stringer on an enlarged scale and indicating the coupling engagement between said scoops.

Fig. 2 is a plan view of one side portion of a scoop detached with respect to the tape; and Fig. 3 is a perspective view of one of the scoops detached.

The present application is a continuation-in-part of the scoop structure disclosed in my prior application Serial Number 307,279; filed August 30, 1952, and modifies the structure of said application to the extent of reinforcing the scoop and providing additional angular bearing surfaces between the scoops to strengthen and reinforce the coupling engagement of the scoops.

In Fig. 1 of the drawing, I have illustrated in enlarged side view of coupled scoops 10, 10' on a small section of a pair of stringers 11, 11', the beaded edges of the stringers being indicated at 12, 12'. At 13, 13' is indicated the mounting end portion of each scoop and at 14, 14' is shown the coupling end portion.

As both scoops 10, 10' are of the same construction, the brief description of a single scoop will be given, it being understood that the other scoop has similar structures and, as and when desirable, common parts will be given the same primed references.

Considering Figs. 2 and 3 of the drawing, it will be apparent that the coupling end portion 14 is divided by a center line or ledge 15 into two coupling sides 16 and 17. The coupling side 17 is of more or less conventional contour, that is to say, it has the substantially V-shaped top and bottom recesses 18 forming the female coupling portion of the scoop and a coupling head 19 forming the male coupling portion, the head having upwardly and downwardly projecting V-shaped members 20 which are adapted to enter the recesses 18' of the female coupling portion of the scoop of the companion stringer, as indicated in Fig. 1 of the drawing. The outer ends of the heads 19 are flat, as seen at 21.

The other side 16 of the coupling end portion 14 has upper and lower recesses 22 forming the female coupling portion of the side 16; whereas, the male coupling portion is divided into two coupling parts, one of which comprises raised substantially V-shaped projections 23 which extend directly from the recesses 22 by tapered surfaces 24. Outwardly of the projections 23 and spaced therefrom are reduced coupling heads 25 having upward and downward projections 26, similar to but shorter than the projections 20 which are adapted to extend into the recesses 22 of an opposite scoop, one of the projections 26' of the scoop 10' being shown in this engagement in Fig. 1 of the drawing.

The head 25 or the projections 26' thereof have angular surfaces 27 which are adapted to engage the surfaces 24' of a scoop of a companion stringer, as indicated in Fig. 1 of the drawing. This construction forms recesses 28 on upper and lower surfaces of the coupling end portion 16 between the projections 23 and the projections 26, one of which recesses is clearly illustrated in Fig. 3 of the drawing and these recesses receive the projections 23 on the companion scoop, as previously stated and as illustrated in Fig. 1 of the drawing.

Centrally of the coupling end portion 16 and extending between that part of the coupling end portion having the projections 23 and the head 25 is a rib or web 29 which forms part of the wall structure of the recesses 28, again as clearly illustrated in Fig. 3 of the drawing.

With scoop structures composed of nylon or other plastic material and usually applied to nylon or other synthetic fibre tapes, greater elasticity or stretch prevails than with conventional cotton tapes, thus scoop pitch or, in other words, space between the scoops increases with structures of this type and kind under the load or strain to which the scoops are subjected. For this reason, I have produced a scoop structure which provides added bearing or interlocking surfaces. Normally, strains in the direction of the arrows 30 of Fig. 1 are taken up by interengagement of the heads 19, 19' of coupled scoops in more or less conventional manner, the engagement of these heads being indicated at 31 in Fig. 1 of the drawing. However, if the tapes 11, 11' stretch in directions of the arrows 32, Fig. 1, then the distances between the scoops increase, with the result that the scoops may then pull further apart in the direction of the arrows 30 which might result in a mismeshing. Still further, the scoops constructed of nylon or other plastic material are not as strong as metal scoops and, in order to give greater strength to the scoop structure in resisting the strains to which the scoops are subjected, further engagement is established between the surfaces 24', 27 which, together with the coupling engagement as at 31, gives material added strength to the resulting scoops in their coupling engagement one with the other.

In another method of defining the structure, it may be said that the coupling side 16 of the scoop has two female coupling portions, namely the portions 22 and the portions 28 and two heads, one defined by the projections 23 and the other by the projections 26, these heads being joined and reinforced by the bridging member or web 29.

It will be apparent from a consideration of Fig. 1 of the drawing that the engagement between the surfaces, as at 31 and as between the surfaces 27, 24', are parallel to each other; thus the load is equally distributed between both legs or coupling head sides of the scoop and it will be apparent that the rib 29 gives added strength to the coupling side 16 of the scoop.

By reason of the fact that a single scoop structure is formed, the cost of production of a pair of stringers is simplified. It will be apparent that, as both upper and lower surfaces of the scoops are of the same contour, a single chain can be reversed upon itself in forming a pair of stringers coupled in the manner briefly illustrated in Fig. 1. The coupling side 16, 16' is disposed on one side of the resulting stringer; whereas the coupling side 17, 17' will be arranged on the other side of the stringer.

It will be apparent that the male coupling portion defined by the projections 23 extends the full width of the coupling side 16, whereas, the male coupling portion defined by the projections 26 extends only a part of the width of the side 16; the purpose of the latter construction is to facilitate the production of powder pressed dies, referred to hereinafter, for casting the scoops. It will also be apparent that the projections 23 are disposed inwardly of the scoop with respect to the projections 20; whereas, the projections 26 are disposed outwardly of the projections 20. This construction provides three spaced parallel areas of engagement between coupled scoops.

Considering the invention further from a descriptive standpoint and in more detail, the scoop 10 may be regarded as comprising dissimilar, longitudinal, vertically divided halves 16, 17. That is, when viewed in plan, it may be visualized as having a central vertical plane which divides it into longitudinal halves and which extends angularly with respect to the plane of the tape. This plane passes through the line or ledge 15 shown in Fig. 2, and as noted in said copending application, the plane extends angularly with respect to longitudinal side edges of the scoop; also, the plane is angularly disposed relatively to the plane of an opposed scoop. The coupling end portion of one longitudinal scoop half comprises alined projections 20 on upper and lower sides of the scoop inwardly of which are alined recesses 18. These projections are engageable with the recesses of adjacent opposed scoops to provide an interlock against pull-apart separation of the stringers. The coupling end portion of the other longitudinal scoop half comprises a pair of alined, vertically extending, upper and lower projections 26 at the outer part thereof and a second pair of alined, vertically extending, upper and lower projections 23 spaced inwardly from the first pair and in transverse alinement with at least a portion of the alined recesses 18. The projections 23 extend above and below recesses 18. The two pairs of projections are connected by a horizontally extending web or brace 29 which divides the space between them into upper and lower female coupling portions 28 which receive the projections of the said second pair of projections of adjacent opposed scoops, thereby providing an interlock against transverse separation of the stringers and a further interlock against pull-apart separation. Inwardly of projections 23 is a pair of upper and lower alined depressions 22 which are in transverse alinement with another portion of the recesses 18 and which serve to receive the projections of the said first pair of projections of adjacent opposed scoops, thereby providing an additional interlock against pull-apart separation. The first and second pairs of projections of the scoop 10 engage the depressions and female coupling portions, respectively, of adjacent opposed scoops.

As in the said copending application, sharp bending of the coupled stringers is facilitated by the present scoop construction without danger of mismeshing. Also, the stringers exhibit exceptionally good strength characteristics and are further characterized by their ease of joining. The scoop surfaces are tapered outwardly to opposed sides to facilitate coupling engagement and flexure of the stringers.

By reason of the contour and construction of the scoops, it is possible to cast them using powder pressed metal dies, that is, dies formed from powdered metal by a pressing and sintering technique. As may be appreciated, dies for producing scoops are used in large quantities and they tend to wear out fairly quickly such that a source of cheap dies becomes an important economic factor. Not only must the dies be cheap but they must be accurate as well. Cheap, accurate dies can be produced by the technique of powder metallurgy. Other known methods cannot produce dies as cheaply as by pressing them from powdered metal. In order to make use of powder-pressed dies, however, care must be taken in the design and construction of the scoops to eliminate certain factors. Thus no undercuts can be present. The surfaces of the scoops must be "balanced," that is, severely angular surfaces must be avoided. In addition, no cores may be used. For production reasons it is preferred to employ dies having multiple scoop cavities, say up to 16 cavities or more, and it is impractical to withdraw long cores from so many scoops which are formed in such dies. The scoop design and construction provided by this invention avoid the foregoing factors and enable powder-pressed dies to be employed to make the scoops.

Having fully described my invention, what I claim as new and desire to secure by Letters Patent is:

1. A scoop for separable fasteners of the character described, said scoop comprising a mounting end portion and a coupling end portion, the coupling end portion being divided into two coupling sides, one coupling side having an inner female coupling portion defined by opposed recesses and a coupling head having upwardly and downwardly arranged opposed projections, the projections of the scoops of one stringer being insertable into the recesses of the scoops of the opposed stringer, the heads of opposed stringers having engaging angular surfaces, the other coupling side of the scoop being defined by two pairs of opposed recesses forming female coupling portions and two pairs of projections forming male coupling portions, the male coupling portions of the last named side of the scoop having surfaces engaging corresponding surfaces of the male coupling portions of a companion scoop, and said surfaces being parallel to each other.

2. A scoop for separable fasteners of the character described, said scoop comprising a mounting end portion and a coupling end portion, the coupling end portion being divided into two coupling sides, one coupling side having an inner female coupling portion defined by opposed recesses and a coupling head having upwardly and downwardly arranged opposed projections, the projections of the scoops of one stringer being insertable into the recesses of the scoops of the opposed stringer, the heads of opposed stringers having engaging angular surfaces, the other coupling side of the scoop being defined by two pairs of opposed recesses forming female coupling portions and two pairs of projections forming male coupling portions, the male coupling portions of the last named side of the scoop having surfaces engaging corresponding surfaces of the male coupling portions of a companion scoop, said surfaces being parallel to each other, and a rib joining the male coupling portions of the last named side of the scoop.

3. A scoop for separable fasteners of the character described, said scoop comprising a mounting end portion and a coupling end portion, the coupling end portion being divided into two coupling sides, one coupling side having an inner female coupling portion defined by opposed recesses and a coupling head having upwardly and downwardly arranged opposed projections, the projections of the scoops of one stringer being insertable into the recesses of the scoops of the opposed stringer, the heads of opposed stringers having engaging angular surfaces, the other coupling side of the scoop being defined by two pairs of opposed recesses forming female coupling portions and two pairs of projections forming male coupling portions, the male coupling portions of the last named side of the scoop having surfaces engaging corresponding surfaces of the male coupling portions of a companion scoop, said surfaces being parallel to each other, a rib joining the male coupling portions of the last named side of the scoop, one male coupling portion of the last named side of the scoop extending the full width of said side, and the other male coupling portion of said side of the scoop extending only a part of the width thereof.

4. A scoop for separable fastener stringers of the class described, said scoop comprising a mounting end portion and a coupling end portion, the coupling end portion being divided into two coupling sides, one coupling side having upward and downward opposed projections, inwardly of which are opposed recesses, the other coupling side having two pairs of upward and downward opposed projections, inwardly of each of which are opposed recesses, one of the last named pairs of projections being disposed outwardly on the coupling end portion with respect to the projections of the first coupling side, and the second pair of projections being disposed inwardly of the projections of said first coupling side.

5. A scoop for separable fastener stringers of the class described, said scoop comprising a mounting end portion and a coupling end portion, the coupling end portion being divided into two coupling sides, one coupling side having upward and downward opposed projections, inwardly of which are opposed recesses, the other coupling side having two pairs of upward and downward opposed projections, inwardly of each of which are opposed recesses, one of the last named pairs of projections being disposed outwardly on the coupling end portion with respect to the projections of the first coupling side, the second pair of projections being disposed inwardly of the pair of projections of said first coupling side, and the first named pair of projections of the second coupling side being short and the second pair extending the full width of said side.

6. A scoop for separable fastener stringers of the class described, said scoop comprising a mounting end portion and a coupling end portion, the coupling end portion being divided into two coupling sides, one coupling side having upward and downward opposed projections, inwardly of which are opposed recesses, the other coupling side having two pairs of upward and downward opposed projections, inwardly of each of which are opposed recesses, one of the last named pairs of projections being disposed outwardly on the coupling end portion with respect to the projections of the first coupling side, the second pair of projections being disposed inwardly of the projections of said first coupling side, the first named pair of projections of the second coupling side being short and the second pair extending the full width of said side, and a rib joining that portion of the scoop having said pairs of projections.

7. A scoop for separable fastener stringers of the class described, said scoop comprising a mounting end portion and a coupling end portion, the coupling end portion being divided into two coupling sides, one coupling side having upward and downward opposed projections, inwardly of which are opposed recesses, the other coupling side having two pairs of upward and downward opposed projections, inwardly of each of which are opposed recesses, one of the last named pairs of projections being disposed outwardly on the coupling end portion with respect to the projections of the first coupling side, the second pair of projections being disposed inwardly of the projections of said first coupling side, the first named pair of projections of the second coupling side being short and the second pair extending the full width of said side, a rib joining that portion of the scoop having said pairs of projections, and the division between the coupling sides having surfaces disposed angularly to longitudinal side edges of said scoop.

8. In separable fastener stringers, comprising a pair of stringer tapes, scoops spaced along one edge of the tapes, said scoops having coupling end portions extending beyond the tape edge, the coupling end portions having two coupling sides, means on one coupling side of each scoop of one stringer forming, at upper and lower surfaces of the scoop, pairs of parallel surfaces having a bearing engagement with corresponding surfaces of scoops of a companion stringer, the other coupling side of each scoop having a bearing surface arranged intermediate and parallel to the first bearing surfaces and adapted to engage a corresponding surface of scoops of a companion stringer in forming, between coupled stringers, three parallel engaging bearing surfaces at each adjacent side of the scoops of the stringers, said first named means defining spaced coupling heads, one of said coupling heads extending the full width of said coupling side, the other head part of said width, and a rib joining said heads.

9. In a separable fastener comprising a pair of stringers each having plastic scoops spaced along one edge of the same, each scoop having a mounting end portion and a coupling end portion, the improvement wherein each scoop comprises dissimilar, longitudinal, vertically divided halves, the coupling end portion of one longitudinal scoop half comprising alined projections on upper and lower sides of the scoop inwardly of which are alined recesses, said projections being engageable with the recesses of a pair of adjacent opposed scoops to provide an interlock against pull-apart separation of the stringers; the coupling end portion of the other longitudinal scoop half comprising a pair of alined, upper and lower, vertically extending projections at the outer part of the latter coupling end portion, a second pair of alined, upper and lower, vertically extending projections inwardly spaced from said first pair and in transverse alinement with at least a portion of said alined recesses, said second pair of projections extending above and below said recesses on said upper and lower sides, respectively, of said scoop; a horizontally extending web connecting said first and second pairs of projections and dividing the space therebetween into upper and lower female coupling portions, said latter portions receiving the projections of the said second pair of projections of adjacent opposed scoops thereby to provide an interlock against transverse separation of the stringers and a further interlock against pull-apart separation, upper and lower alined depressions inwardly of said second pair of projections and in transverse alinement with another portion of said alined recesses, said depressions receiving the projections of the said first pair of projections of adjacent opposed scoops thereby to provide an additional interlock against pull-apart separation, and said first and second pair of projections engaging the depressions and female coupling portions, respectively, of adjacent opposed scoops.

10. In a separable fastener comprising a pair of stringers each having scoops spaced along one edge of the same, each scoop having a mounting end portion and a coupling end portion, the improvement wherein each scoop comprises dissimilar, longitudinal halves, the coupling end portion of one longitudinal scoop half comprising alined projections on upper and lower sides of the scoop inwardly of which are alined recesses, said projections being engageable with the recesses of a pair of adjacent opposed scoops to provide an interlock against pull-apart separation of the stringers; the coupling end portion of the other longitudinal scoop half comprising a pair of alined, upper and lower projections at the outer part of the latter coupling end portion, a second pair of alined, upper and lower projections inwardly spaced from said first pair and in transverse alinement with at least a portion of said alined recesses, said second pair of projections extending above and below said recesses on said upper and lower sides, respectively, of said scoop; upper and lower female coupling portions disposed intermediate said first and second pairs of projections, said latter portions receiving the projections of the said second pair of projections of adjacent opposed scoops thereby to provide an interlock against transverse separation of the stringers and a further interlock against pull-apart separation, and said second pair of projections engaging the female coupling portions of adjacent opposed scoops.

11. In a separable fastener comprising a pair of stringer tapes each having scoops spaced along one edge of the same, each scoop having a mounting end portion and a coupling end portion, the improvement wherein each scoop comprises dissimilar, longitudinal halves, the coupling end portion of one longitudinal scoop half comprising alined projections on upper and lower sides of the scoop inwardly of which are alined recesses, said projections being engageable with the recesses of a pair of adjacent opposed scoops to provide an interlock against pull-apart separation of the stringers; the coupling end portion of the other longitudinal scoop half comprising a pair of alined, upper and lower projections at the outer part of the latter coupling end portion, a second pair of alined, upper and lower projections inwardly spaced from said first pair and extending above and below said recesses on said upper and lower sides, respectively, of said scoop; upper and lower female coupling portions disposed intermediate said first and second pairs of projections, and said latter portions receiving the projections of the said second pair of projections of adjacent opposed scoops thereby to provide an interlock against transverse separation of the stringers and a further interlock against pull-apart separation.

12. A separable fastener according to claim 11 wherein said longitudinal halves of each scoop are formed by a central longitudinal plane passing vertically through the scoop and extending angularly relatively to the plane of the tape on which said scoop is mounted.

References Cited in the file of this patent

UNITED STATES PATENTS

| | | |
|---|---|---|
| 2,322,537 | Morin | June 22, 1943 |
| 2,349,580 | Marinsky | May 23, 1944 |
| 2,355,996 | Morin | Aug. 15, 1944 |
| 2,392,338 | Polk | Jan. 8, 1946 |

FOREIGN PATENTS

| | | |
|---|---|---|
| 926,777 | France | Oct. 10, 1947 |